United States Patent
Wang

(10) Patent No.: US 8,811,885 B2
(45) Date of Patent: *Aug. 19, 2014

(54) METHOD AND APPARATUS FOR IDENTIFICATION OF BROADCAST SOURCE

(75) Inventor: Avery Li-Chun Wang, Palo Alto, CA (US)

(73) Assignee: Shazam Investments Limited, London (GB)

( * ) Notice: Subject to any disclaimer, the term of this patent is extended or adjusted under 35 U.S.C. 154(b) by 19 days.

This patent is subject to a terminal disclaimer.

(21) Appl. No.: 13/614,329

(22) Filed: Sep. 13, 2012

(65) Prior Publication Data

US 2013/0010204 A1 Jan. 10, 2013

Related U.S. Application Data

(63) Continuation of application No. 13/164,069, filed on Jun. 20, 2011, now Pat. No. 8,290,423, which is a continuation of application No. 10/589,543, filed as application No. PCT/US2005/005254 on Feb. 18, 2005, now Pat. No. 7,986,913.

(60) Provisional application No. 60/545,879, filed on Feb. 19, 2004.

(51) Int. Cl.
*H04H 60/29* (2008.01)
*H04H 60/35* (2008.01)
*H04H 60/58* (2008.01)

(52) U.S. Cl.
USPC .......................................... 455/2.01; 455/3.01

(58) Field of Classification Search
None
See application file for complete search history.

(56) References Cited

U.S. PATENT DOCUMENTS

| | | | |
|---|---|---|---|
| 4,415,767 | A | 11/1983 | Gill et al. |
| 4,450,531 | A | 5/1984 | Kenyon et al. |
| 4,677,466 | A | 6/1987 | Lert, Jr. et al. |
| 4,843,562 | A | 6/1989 | Kenyon et al. |
| 4,852,181 | A | 7/1989 | Morito et al. |
| 5,210,820 | A | 5/1993 | Kenyon |

(Continued)

FOREIGN PATENT DOCUMENTS

| | | |
|---|---|---|
| JP | 11-275032 | 10/1999 |
| JP | 2002-196769 | 7/2002 |

(Continued)

OTHER PUBLICATIONS

Foote, "An Overview of Audio Information Retrieval", ACM-Springer-Multmedia Systems, vol. 7, No. 1, pp. 2-11, ACM Press/Springer-Verlag, Jan. 1999.

(Continued)

*Primary Examiner* — Philip Sobutka
(74) *Attorney, Agent, or Firm* — McDonnell Boehnen Hulbert & Berghoff LLP

(57) ABSTRACT

A user (102) hears an audio program being broadcast and can record a sample of the audio. The sample is then conveyed to an analyzing means (106) to determine to which broadcast station the user is listening. The analyzing means monitors many broadcast channels. Thus, characteristics of the audio sample and samples taken from the broadcast channels can be compared to find a match. Broadcast information pertaining to the broadcast channel from which the match was found may then be reported back to the user, combined with an advertisement of a promotion, prize notification, discount offers, and other information specific for a certain radio station for example.

19 Claims, 5 Drawing Sheets

(56) References Cited

U.S. PATENT DOCUMENTS

| | | |
|---|---|---|
| 5,276,629 A | 1/1994 | Reynolds |
| 5,339,430 A | 8/1994 | Lundin et al. |
| 5,400,261 A | 3/1995 | Reynolds |
| 5,481,294 A | 1/1996 | Thomas |
| 5,768,382 A | 6/1998 | Schneier et al. |
| 5,918,223 A | 6/1999 | Blum et al. |
| 5,970,143 A | 10/1999 | Schneier et al. |
| 6,434,520 B1 | 8/2002 | Kanevsky et al. |
| 6,453,252 B1 | 9/2002 | Laroche |
| 6,484,315 B1 | 11/2002 | Ziese |
| 6,570,080 B1 | 5/2003 | Hasegawa et al. |
| 6,574,594 B2 | 6/2003 | Pitman et al. |
| 6,611,678 B1 | 8/2003 | Zweig et al. |
| 6,748,360 B2 | 6/2004 | Pitman et al. |
| 6,834,308 B1 | 12/2004 | Ikezoye et al. |
| 6,925,489 B1 | 8/2005 | Curtin |
| 6,941,275 B1 | 9/2005 | Swierczek |
| 7,174,293 B2 | 2/2007 | Kenyon et al. |
| 7,194,752 B1 | 3/2007 | Kenyon et al. |
| 7,284,255 B1 | 10/2007 | Apel et al. |
| 7,986,913 B2 | 7/2011 | Wang |
| 8,290,423 B2 * | 10/2012 | Wang ............................ 455/2.01 |
| 2002/0072982 A1 | 6/2002 | Barton et al. |
| 2002/0083060 A1 | 6/2002 | Wang et al. |
| 2002/0143530 A1 | 10/2002 | Pitman et al. |
| 2011/0244784 A1 | 10/2011 | Wang |

FOREIGN PATENT DOCUMENTS

| | | |
|---|---|---|
| WO | 95/12278 | 5/1995 |
| WO | WO 01/04870 | 1/2001 |
| WO | WO 01/76290 | 10/2001 |
| WO | WO 02/13396 | 2/2002 |
| WO | WO 2005/079499 | 9/2005 |
| WO | WO 01/88900 | 11/2011 |

OTHER PUBLICATIONS

Foote, "Content-Based Retrieval of Music and Audio", Multimedia Storage and Archiving Systems II, Proc. of SPIE, vol. 3229, pp. 138-14, 1997.

Brown et al., "Automatic Content-Based Retrieval of Broadcast News", Proc. ACM Multimedia 95, San Francisco, Nov. 1995.

Manber, "Finding Similar Files in a Large File Systems," Dept. of Computer Science, The University of Arizona, Tucson Arizona 85721, pp. 1-10, Oct. 1993.

Liu, "Landmark detection for distinctive feature-based speech recognition", J. Acouist. Soc. Am. 100 (5), pp. 3417-3430 Nov. 1996.

Miller, "Audio Fingerprinting: Nearest Neighbor Search in High Dimensional Binary Spaces,"IEEE Multimedia Signal Processing Workshop 2002, St. Thomas, US Virgin Islands.

Wold et al., Content-Based Classification, Search and Retrieval of Audio, in IEEE Multimedia, vol. 3, No. 3, Fall 1996, pp. 27-36.

Yang, "Music Database Retrieval Based on Spectral Similarity", Stanford University Database Group Technical Report 2001-14, http://citeseer.ist.psu.due/yang01music.html., submitted Mar. 28, 2001 [Retrieved from the internet on Jun. 6, 2005] [Retrieved from URL://http://citeseer.ist.psu.edu/yang01musci.html].

International Search Report for International Application No. PCT/US05/05254, dated Mar. 23, 2006.

European Search Report for European Patent Application No. 11184533.5 mailed Dec. 28, 2011.

* cited by examiner

METHOD AND APPARATUS FOR IDENTIFICATION OF BROADCAST SOURCE

CROSS-REFERENCE TO RELATED APPLICATIONS

The present patent application is a continuation of U.S. patent application Ser. No. 13/164,069, filed on Jun. 20, 2011, which is a continuation of U.S. patent application Ser. No. 10/589,543, entitled "Method And Apparatus For Identification Of Broadcast Source", filed on Oct. 31, 2006, which application is a U.S. national stage entry of International Application No. PCT/US2005/005254, filed on Feb. 18, 2005, which application claims priority under 35 U.S.C. Section 119(e) to U.S. Provisional Patent Application No. 60/545,879, filed on Feb. 19, 2004, the disclosures of which are herein incorporated by reference in their entirety.

TECHNICAL FIELD

The present invention generally relates to identifying a source of transmitted content, and more particularly, to matching audio or media file samples to a broadcast source from which the sample was transmitted.

BACKGROUND

As industries move toward multimedia rich working environments, usage of all forms of audio and visual content representations (radio broadcast transmissions, streaming video, audio canvas, visual summarization, etc.) becomes more frequent. Whether a user, content provider, or both, everybody searches for ways to optimally utilize such content. For example, one method that has much potential for creative uses is content identification. Enabling a user to identify content that the user is listening to or watching offers a content provider new possibilities for success.

As a specific example, suppose a user hears a song or piece of music broadcast over the radio that the user would like to purchase, but the user cannot identify the song. A content provider could enable a fingerprint of the song to be captured via a telephone handset and then identify the content. After recognition, the content provider could send identifying information (e.g., title, artist(s) and record label) to the user, with e-commerce options, such as to order the music or a corresponding ring tone, for example.

Furthermore, if the user could identify a broadcast source of desired content, more commerce possibilities become available to the content provider, such as advertisement and promotional plans, for example.

Existing methods for identifying the broadcast source of desired content have some drawbacks. For example, watermarks have been used by broadcast stations for identification purposes. Each broadcast station would embed a watermark into an audio stream that identifies the respective station. Thus, each broadcast station would need to actively embed a watermark into the audio stream, increasing data processing complexity, and furthermore each broadcast station would need to use a watermarking technique that follows an agreed-upon standard used by a source identification system. Any station that does not follow such standards would not be identified by these means. Furthermore, a watermark signal needs to be robust enough to withstand distortion, which can occur if audio is sampled within a noisy room with reverberation or if the audio is subject to lossy compression such as GSM, AMR, EVRC, QCP, etc., for example.

Another method for identifying the broadcast source of desired content includes performing a cross-correlation analysis between an audio sample and audio feeds captured from broadcast stations (e.g., from a monitoring station). A matching station would show a strong spike in the cross correlation. However, a difficulty with cross-correlation analysis is that where a lossy compression means is employed, signals are weak and strong correlations may be difficult to achieve. In many voice codecs, phase information can be destroyed and a cross-correlation analysis would not yield a peak even if the audio sample and correct matching broadcast feed were cross-correlated, for example.

New methods for identifying broadcast sources or content providers of desired content are desirable.

SUMMARY

Within embodiments disclosed herein, a method for identifying a broadcast source of an audio sample is disclosed. The method includes recording an audio sample and a time at which the audio sample was recorded, and then identifying characteristics of the audio sample and an estimated time offset of the audio sample. The estimated time offset defines a time difference between a start time of the audio sample and the time at which the audio sample was recorded. The method further includes comparing the characteristics and the estimated time offset of the audio sample with characteristics and time offsets of samples taken from broadcast stations and taken at approximately the time at which the audio sample was recorded, and based on the comparison, identifying a broadcast station from which the audio sample was broadcast.

In another embodiment, the method for identifying a broadcast source of content includes comparing an identity of an audio sample with identities of broadcast audio samples taken from broadcast channels being monitored, and comparing a time offset of the audio sample with time offsets of the broadcast audio samples. The time offsets define an elapsed time between when a sample was taken and when the time offset comparison occurs plus a relative time offset, which defines a time difference between a start time of a sample and a time when a sample was recorded. The method further includes based on substantially matching identities and substantially matching time offsets, identifying a broadcast channel from which the audio sample was recorded.

In still another embodiment, a monitoring station is disclosed that includes broadcast channel samplers, an audio recognition engine and a processor. The broadcast channel samplers sample audio from respective broadcast stations and the audio recognition engine determines characteristics of the audio sampled from the respective broadcast stations and an estimated time offset of the audio that defines a time between a beginning of an original recording from which the audio sample was taken and a time at which the sample was taken. The processor receives a user audio sample, compares the characteristics and the estimated time offset of the audio sampled from the respective broadcast stations and taken at approximately the time at which the user audio sample was recorded with characteristics and a time offset of the user audio sample, and based on the comparisons, identifies a broadcast station from which the user audio sample was broadcast.

These as well as other features, advantages and alternatives will become apparent to those of ordinary skill in the art by reading the following detailed description, with appropriate reference to the accompanying drawings.

DETAILED DESCRIPTION OF ILLUSTRATIVE EMBODIMENTS

In the field of content identification, it may be desirable to identify not only content, but also a source (e.g., channel, stream, or station) of a broadcast transmission. For example, it may be desirable to detect from a free-field audio sample of a radio broadcast which radio station a user is listening to, as well as to what song the user is listening.

Exemplary embodiments described below illustrate a method and apparatus for identifying a broadcast source of desired content. In one embodiment, a user can utilize an audio sampling device including a microphone and optional data transmission means to identify broadcast sources. The user may hear an audio program being broadcast from some broadcast means, such as radio or television, and can record a sample of the audio using the audio sampling device. The sample is then conveyed to an analyzing means to determine to which broadcast station the user is listening. The broadcast information may then be reported back to the user, combined with an advertisement of a promotion, prize notification, discount offers, and other information specific for a certain radio station, for example. The information may also be reported to a consumer tracking agency, or otherwise aggregated for statistical purposes, for example. Thus, not only can an audio sample be analyzed to identify its content using a free-field content identification technique, the audio sample may also be analyzed to determine its broadcast source.

Figure 1:
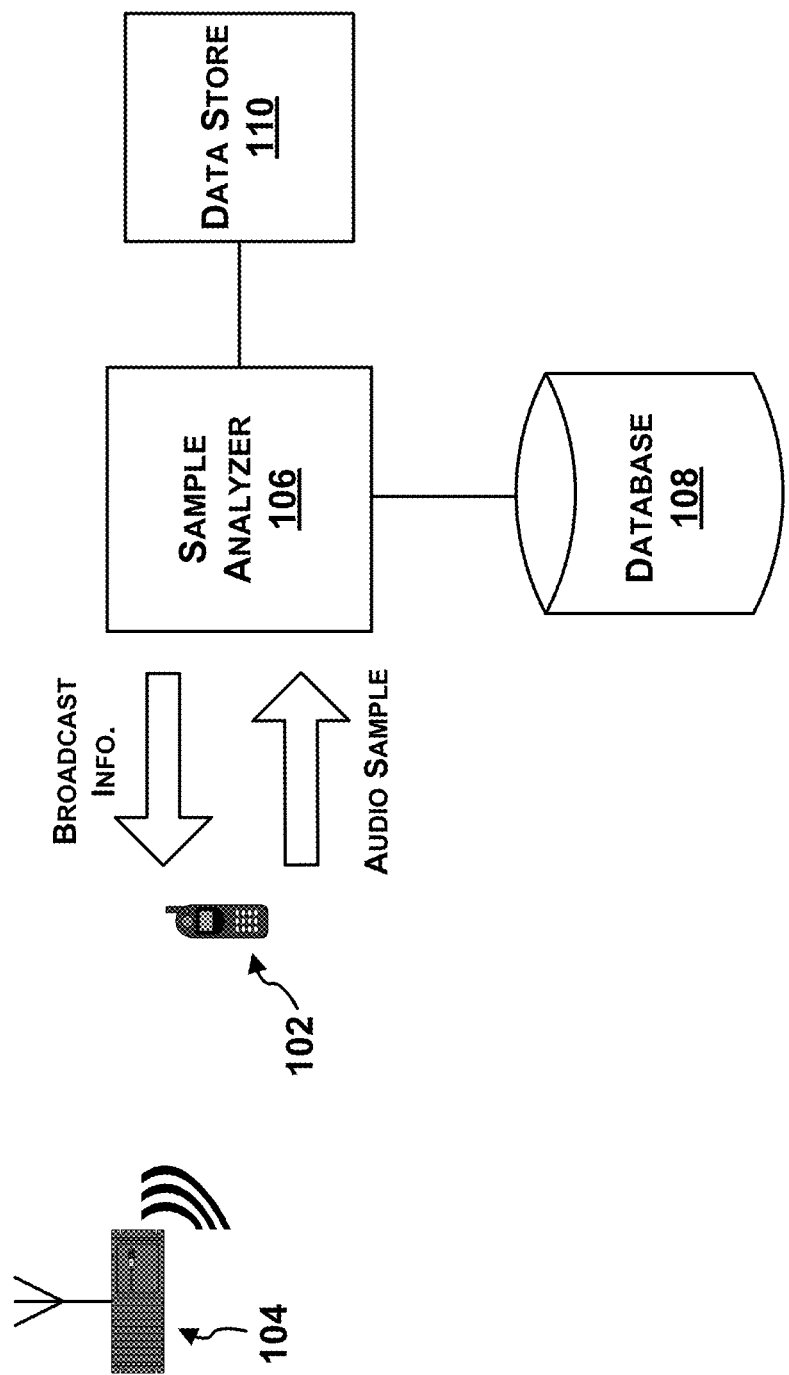
FIG. 1 illustrates one example of a system for identifying a broadcast source of desired content.

Referring now to the figures, FIG. 1 illustrates one example of a system for identifying a broadcast source of desired content. The system includes an audio sampling device 102, which a user utilizes to record an audio sample broadcast or transmitted by a broadcaster 104, such as a radio or television content provider for example. The user can then cause the audio sampling device 102 to send the audio sample to a sample analyzer 106 via a wireless or wired means. As such, the audio sampling device 102 may be a mobile cellular telephone, a PDA, or any device with processing means. Using the audio sample, the sample analyzer 106 can identify information pertaining to the broadcast, such as by accessing a database 108 containing audio sample and broadcast information, for example. The information may include content identification and/or broadcast identification. The broadcast information may then be reported back to the user by sending the information to the audio sampling device 102. Additional information may also be sent with the broadcast information, such as promotional advertisements, discount offers, and other information specific for a certain broadcaster, for example. The broadcast information may also be reported to a data store 110, which may be a consumer tracking agency, or other statistical center, for example.

Source Identification Via Relative Time Comparison

In one embodiment, a broadcast source is identified by performing a time-stamped recording of an audio sample and recordings from broadcast channels, and then identifying characteristics of the recordings for comparison. For example, "fingerprints" of recordings taken at similar times can be compared, and such a comparison allows for a direct identification of the broadcast channel from which the audio sample was recorded. Using this method, spectrogram peaks or other characteristics of the signal rather than the direct signals are compared. Further, the correct broadcast channel can be identified without any content identification being required, for example.

Figure 2:
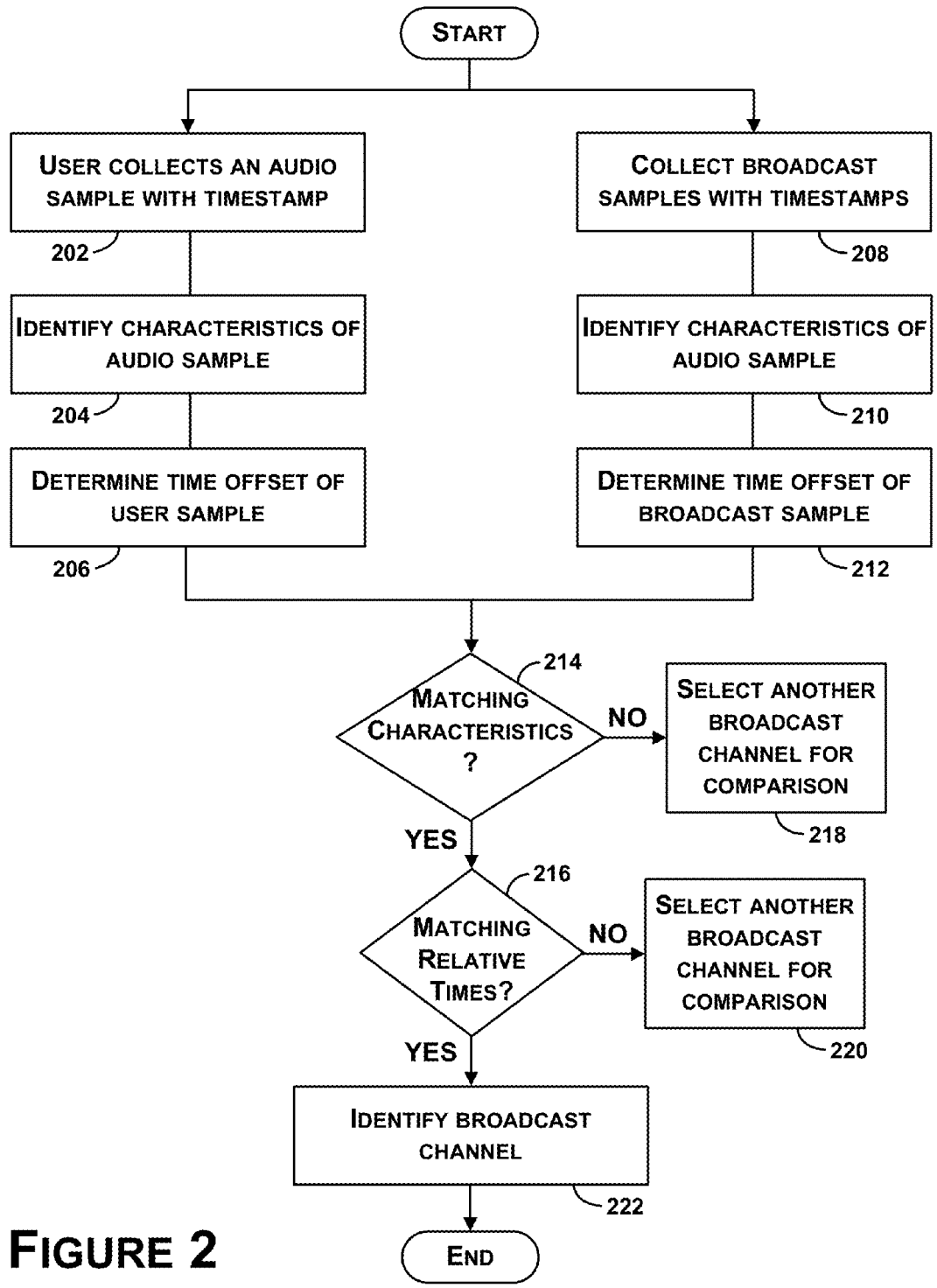
FIG. 2 is a flowchart depicting one embodiment of a method of identifying a broadcast source.

FIG. 2 is a flowchart depicting the method of identifying a broadcast source. Initially, in the field, a user may collect an audio sample with a sampling device, as shown at block 202. The sampling device will further time stamp the sample in terms of a "real-time" offset from a common time base. Using the technique of Wang and Smith (described more fully below), described within U.S. Patent Application Publication US 2002/0083060, entitled System and Methods for Recognizing Sound and Music Signals in High Noise and Distortion, the entire disclosure of which is herein incorporated by reference as if fully set forth in this description, characteristics of the sample and an estimated time offset of the audio sample within the "original" recording are determined, as shown at blocks 204 and 206 (e.g., to determine the point in a song when the sample was recorded).

At the same time, samples from broadcast channels being monitored are recorded, as shown at block 208. Similar to user samples, each broadcast sample is also time stamped in terms of a "real-time" offset from a common time base. Further, using the technique of Wang and Smith, described below, characteristics and an estimated time offset of the broadcast sample within the "original" recording are determined, as shown at blocks 210 and 212 (e.g., to determine the point in a song when the sample was recorded).

Then the user sample characteristics are compared with characteristics from broadcast samples that were taken at or near the time the user sample was recorded, as shown at block 214. The user audio sample time stamp is used to identify broadcast samples for comparison. Further, the time offset of the user audio sample is compared to the time offset of the broadcast sample to identify a match, as shown at block 216. If the real-time offsets are within a certain tolerance, e.g., one second, then the user audio sample is considered to be originating from the same source as the broadcast sample, since the probability that a random performance of the same audio content (such as a hit song) is synchronized to less than one second in time is low.

The user audio sample is compared with samples from all broadcast channels until a match is found, as shown at blocks 218 and 220. Once a match is found, the broadcast source of the user sample is identified, as shown at block 222.

Figure 3:
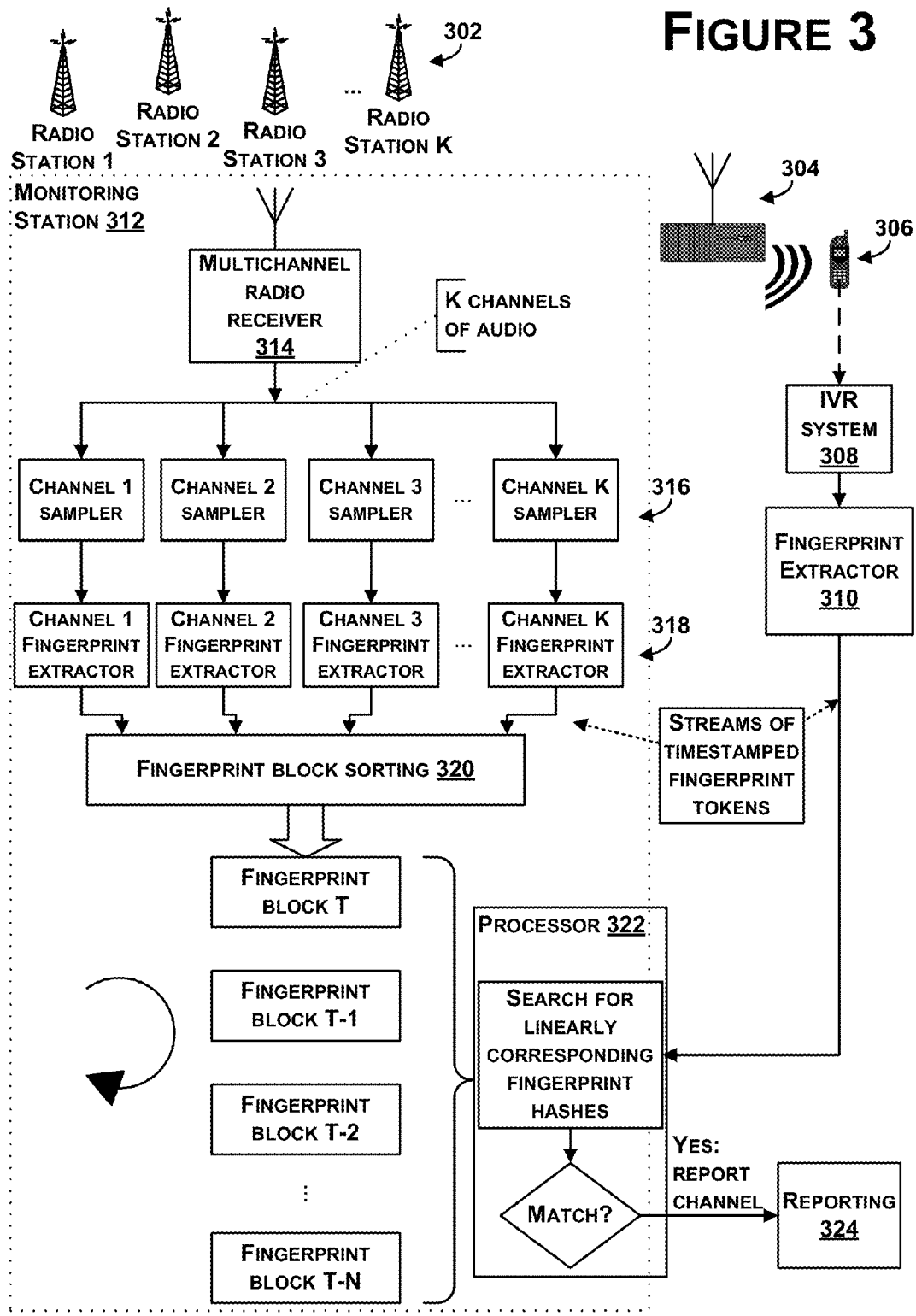
FIG. 3 illustrates another example of a system to identify a broadcast source of an audio sample.

FIG. 3 illustrates one example of a system to identify a broadcast source of an audio sample according to the method shown in FIG. 2. The audio sample may originate from any of radio station 1, radio station 2, radio station 3, . . . , or radio station k 302. A user may record the audio sample being broadcast from an individual receiver 304 on an audio sampling device 306 (e.g., a mobile telephone), along with a sample time (e.g., time according to standard reference clock at which the sample is recorded).

The user may then dial a service to identify broadcast information pertaining to the audio sample, such as an IVR answering system 308, for example. Based on system setup and user constraints, the audio sample is provided to the IVR system 308 from any number of analog or digital sources, such as a stereo system, television, radio broadcast, Internet streaming broadcast, or any other suitable means of transmitting such recorded material. Depending on the source, the sample can be in the form of acoustic waves, radio waves, a digital audio PCM stream, a compressed digital audio stream (such as Dolby Digital or MP3), or an Internet streaming broadcast. A user interacts with the IVR system 308 through a standard interface such as a telephone, mobile telephone, web browser, or email.

The system 308 will initially receive the audio sample from the sampling device 306 and then identify or compute characteristics or fingerprints of the sample. The particular locations within the sample at which fingerprints are computed depend on reproducible points in the sample. Such reproducibly computable locations are referred to as "landmarks." The location within the sample of the landmarks can be determined by the sample itself, i.e., is dependent upon sample qualities, and is reproducible. That is, the same landmarks are computed for the same signal each time the process is repeated. A landmarking scheme may mark about 5-10 landmarks per second of sound recording; of course, landmarking density depends on the amount of activity within the sound recording.

One landmarking technique, known as Power Norm, is to calculate the instantaneous power at every possible timepoint in the recording and to select local maxima. One way of doing this is to calculate the envelope by rectifying and filtering the waveform directly. Another way is to calculate the Hilbert transform (quadrature) of the signal and use the sum of the magnitudes squared of the Hilbert transform and the original signal. Other methods for calculating landmarks may also be used.

Once the landmarks have been computed, a fingerprint is computed at or near each landmark timepoint in the recording. The nearness of a feature to a landmark is defined by the fingerprinting method used. In some cases, a feature is considered near a landmark if it clearly corresponds to the landmark and not to a previous or subsequent landmark. In other cases, features correspond to multiple adjacent landmarks. The fingerprint is generally a value or set of values that summarizes a set of features in the recording at or near the timepoint. In one embodiment, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks.

Fingerprints can be computed by any type of digital signal processing or frequency analysis of the signal. In one example, to generate spectral slice fingerprints, a frequency analysis is performed in the neighborhood of each landmark timepoint to extract the top several spectral peaks. A fingerprint value is just the single frequency value of the strongest spectral peak.

To take advantage of the time evolution of many sounds, a set of timeslices is determined by adding a set of time offsets to a landmark timepoint. At each resulting timeslice, a spectral slice fingerprint is calculated. The resulting set of fingerprint information is then combined to form one multitone or multi-slice fingerprint. Each multi-slice fingerprint is more unique than the single spectral slice fingerprint, because it tracks temporal evolution, resulting in fewer false matches in a database index search.

For more information on calculating characteristics or fingerprints of audio samples, the reader is referred to U.S. Patent Application Publication US 2002/0083060, to Wang and Smith, entitled System and Methods for Recognizing Sound and Music Signals in High Noise and Distortion, the entire disclosure of which is herein incorporated by reference as if fully set forth in this description.

Thus, the system 308 will receive the audio sample from the sampling device 306 and compute fingerprints of the sample. The system 308 may compute the fingerprints by contacting additional recognition engines, such as a fingerprint extractor 310. The system 308 will thus have timestamped fingerprint tokens of the audio sample that can be used to compare with broadcast samples.

A broadcast monitoring station 312 monitors each broadcast channel of the radio stations 302 to obtain the broadcast samples. The monitoring station 312 includes a multi-channel radio receiver 314 to receive broadcast information from the radio stations 302. The broadcast information is sent to channel samplers 1 . . . k 316. Each channel sampler 316 has a channel fingerprint extractor 318 for calculating fingerprints of the broadcast samples, as described above, and as described within Wang and Smith.

The monitoring station 312 can then sort and store fingerprints for each broadcast sample for a certain amount of time within a fingerprint block sorter 320. The monitoring station 312 can continually monitor audio streams from the broadcasters while noting the times corresponding to the data recording. After a predetermined amount of time, the monitoring station 312 can write over stored broadcast sample fingerprints to refresh the information to coordinate to audio samples currently being broadcast, for example. A rolling buffer of a predetermined length can be used to hold recent fingerprint history. Since the fingerprints within the rolling buffer will be compared against fingerprints generated from the incoming sample, fingerprints older than a certain cutoff time can be ignored, as they will be considered to be representing audio collected too far in the past. The length of the buffer is determined by a maximum permissible delay plausible for a real-time simultaneous recording of audio signals originating from a real-time broadcast program, such as network latencies of Voice-over-IP networks, internet streaming, and other buffered content. The delays can range from a few milliseconds to a few minutes.

A rolling buffer may be generated using batches of time blocks, e.g., perhaps M=10 seconds long each: every 10 seconds blocks of new [hash+channel ID+timestamp] are dumped into a big bucket and sorted by hash. Then each block ages, and parallel searches are done for each of N blocks to collect matching hashes, where N*M is the longest history length, and (N−1)*M is the shortest. The hash blocks can be retired in a conveyor-belt fashion.

Upon receiving an inquiry from the user sampling device 306 to determine broadcast information corresponding to a given audio sample, the monitoring station 312 searches for linearly corresponding fingerprint hashes within the broadcast sample fingerprints. In particular, a processor 322 in the monitoring station 312 first selects a given broadcast channel (using selector 320) to determine if a broadcast sample identity of a broadcast sample recorded at or near the user sample time matches the user audio sample fingerprints. If not, the selector 320 selects the next broadcast channel and continues searching for a match.

Fingerprints of the broadcast samples and the user audio sample are matched by generating correspondences between equivalent fingerprints, and the file that has the largest number of linearly related correspondences or whose relative locations of characteristic fingerprints most closely match the relative locations of the same fingerprints of the audio sample is deemed the matching media file.

In particular, the user audio sample fingerprints are used to retrieve sets of matching fingerprints stored in the sorter 320. The set of retrieved fingerprints are then used to generate correspondence pairs containing sample landmarks and retrieved file landmarks at which the same fingerprints were computed. The resulting correspondence pairs are then sorted by media file identifiers, generating sets of correspondences between sample landmarks and file landmarks for each applicable file. Each set is scanned for alignment between the file landmarks and sample landmarks. That is, linear correspondences in the pairs of landmarks are identified, and the set is scored according to the number of pairs that are linearly related. A linear correspondence occurs when a large number of corresponding sample locations and file locations can be described with substantially the same linear equation, within an allowed tolerance. The file of the set with the highest score, i.e., with the largest number of linearly related correspondences, is the winning file.

Furthermore, fingerprint streams of combinatorial hashes from multiple channels may be grouped into sets of [hash+channel ID+timestamp], and these data structures may be placed into a rolling buffer ordered by time. The contents of the rolling buffer may further be sorted by hash values for a faster search for matching fingerprints with the audio sample, e.g., the number of matching temporally-aligned hashes is the score.

A further step of verification may be used in which spectrogram peaks may be aligned. Because the Wang and Smith technique generates a relative time offset, it is possible to temporally align the spectrogram peak records within about 10 ms in the time axis, for example. Then, the number of matching time and frequency peaks can be determined, and that is the score that can be used for comparison.

While it may be possible for two distinct signals to contain a number of identical fingerprints, it is unlikely that these fingerprints have the same relative time evolutions. For example, if the relative offset is near zero then it is likely that the streams are being monitored from the same source. Longer and random time delays could mean that the user is listening to an independent but coincident copy of the same audio program. The requirement for linear correspondences is a key feature, and provides better recognition than techniques that simply count the total number of features in common or measure the similarity between features.

Once the correct audio sound has been identified, the result is reported to the user or a system 324 by any suitable method. For example, the result can be reported by a computer printout, email, web search result page, SMS (short messaging service) text messaging to a mobile phone, computer-generated voice annotation over a telephone, or posting of the result to a web site or Internet account that the user can access later. The reported results can include identifying information of the source of the sound such as the name of the broadcaster, broadcast recording attributes (e.g., performers, conductor, venue); the company and product of an advertisement; or any other suitable identifiers. Additionally, biographical information, information about concerts in the vicinity, and other information of interest to fans can be provided; hyperlinks to such data may be provided. Reported results can also include the absolute score of the sound file or its score in comparison to the next highest scored file.

For more information regarding fingerprint calculation and comparison, the reader is referred to U.S. Patent Application Publication US 2002/0083060, to Wang and Smith, entitled System and Methods for Recognizing Sound and Music Signals in High Noise and Distortion, the entire disclosure of which is herein incorporated by reference as if fully set forth in this description.

Within the embodiment described above for broadcast source identification, it was assumed that the user sampling device 306 would record a sample, and then send the sample to the monitoring station 312 for comparison. Alternatively, the user sampling device 306 could contact the monitoring station 312, and send a sample to the monitoring station 312 instantaneously (e.g., in the case where the sampling device 306 is a phone, the user can call into the monitoring station 312 and stream a sample to the monitoring station 312 as a phone call conversation). In yet another example, the user sampling device 306 could record a sample, identify fingerprints of the sample, and just send the fingerprints to the monitoring station 312 for comparison. Other examples are possible as well.

Source Identification Via Time-Stamped Identity

Figure 4:
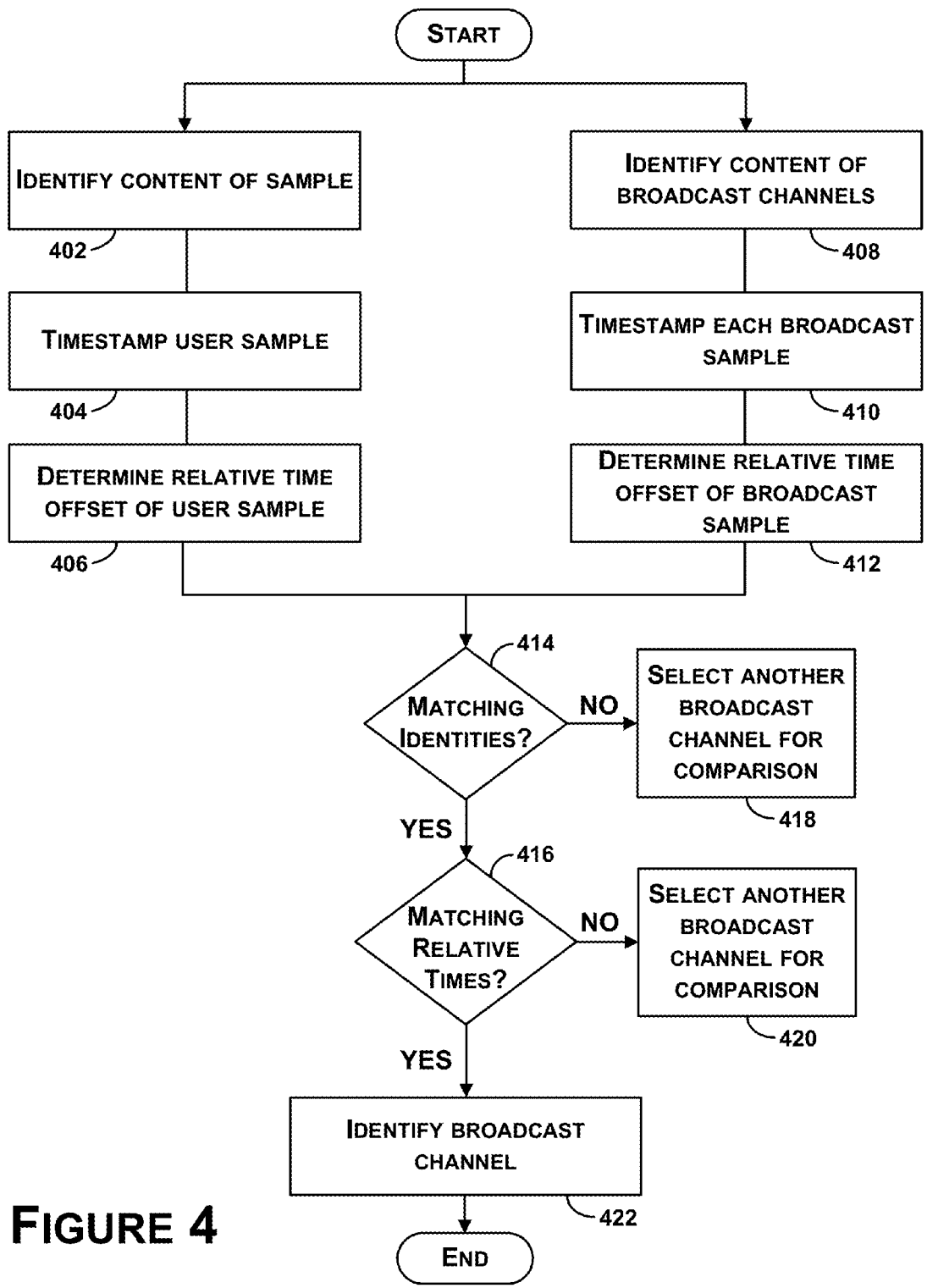
FIG. 4 is a flowchart depicting another embodiment of a method of identifying a broadcast source.

In another embodiment, a broadcast source can be identified by performing a timestamped identification. FIG. 4 illustrates one example of a flowchart depicting functional steps for performing the timestamped broadcast identification. Initially, a user audio sample collected by the user is identified using a content identification means, as shown at block 402, such as the one described above by Wang and Smith (e.g., identifying an audio sample out of a database of audio content files). While the user audio sample is collected, a user sample timestamp (UST) is taken to mark the beginning time of the audio sample based on a standard reference clock, as shown at block 404. Using the identification method disclosed by Wang and Smith, as discussed above, produces an accurate relative time offset between a beginning of the identified content file from the database and a beginning of the audio sample being analyzed, e.g., a user may record a ten second sample of a song that was 67 seconds into a song. Hence, a user sample relative time offset (USRTO) and a user sample identity are noted as a result of identifying the user audio sample, as shown at block 406.

Alternatively, it is noted that the user audio sample may be transmitted to a central identification server, or partially or fully analyzed on the user audio sampling device in order to produce the user sample identity, user sample timestamp (UST) and user sample relative time offset (USRTO), for example.

At the same time, broadcast audio samples are taken periodically from each of at least one broadcast channel being monitored by a monitoring station; and similarly, a content identification step is performed for each broadcast channel, as shown at block 408. The broadcast samples should be taken frequently enough so that at least one sample is taken per audio program (i.e., per song) in each broadcast channel. For example, if the monitoring station records 10 second samples, after a content identification, the monitoring station would know the length of the song, and also how much longer before the song is over. The monitoring station could thus calculate the next time to sample a broadcast channel based on the remaining length of time of the song, for example.

For each broadcast sample, a broadcast sample timestamp (BST) is also taken to mark the beginning of each sample based on the standard reference clock, as shown at block 410. Further, a relative time offset between the beginning of the identified content file from the database and the beginning of the broadcast sample being analyzed is computed. Hence, a broadcast sample relative time offset (BSRTO) and a broadcast sample identity is noted as a result of identifying each broadcast audio sample, as shown at block 412.

To identify a broadcast source, the user audio sample and broadcast audio samples are compared to first identify matching sample identities, as shown at block 414, and then to identify matching "relative times" as shown at block 416. If no matches are found, another broadcast channel is selected for comparison, as shown at blocks 418 and 420. If a match is found, the corresponding broadcast information is reported back to the user, as shown at block 422.

The comparisons of the user and broadcast samples are performed as shown below:

$$(\text{User sample identity}) = (\text{Broadcast sample identity}) \quad \text{Equation (1)}$$

$$\text{USRTO} + (\text{ref time} - \text{UST}) = \text{BSRTO} + (\text{ref time} - \text{BST}) + \text{delay} \quad \text{Equation (2)}$$

where the ref time is a common reference clock time, and (ref time−UST) and (ref time−UST) take into account the possibility for different sampling times by the user audio sampling device and the monitoring station (e.g., (ref. time−BST) =elapsed time since last broadcast sample and now). For example, if broadcast stations are sampled once per minute, and since user samples can occur at any time, to find an exact match, a measure of elapsed time since last sample for each of the broadcast and user sample may be needed. In Equation (2), the delay is a small systematic tolerance that depends on the time difference due to propagation delay of the extra path taken by the user audio sample, such as for example, latency through a digital mobile phone network. Furthermore, any algebraic permutation of Equation (2) is within the scope of the present application.

Thus, matching the sample identities ensures that the same song, for example, is being compared. Then, matching the relative times translates the samples into equivalent time frames, and enables an exact match to be made.

As a specific example, suppose the monitoring station samples songs from broadcasters every three minutes, so that at 2:02 pm the station begins recording a 10 second interval of a 4 minute long song from a broadcaster, which began playing the song at 2:00 pm. Thus, BST=2:02 pm, and BSTRO=2 minutes. Suppose a user began recording the same song at 2:03 pm. Thus, UST=2:03, and USRTO=3 minutes. If the user contacts the monitoring station now at 2:04 pm to identify a broadcast source of the song, Equation (2) above will be as follows (assuming a negligible delay):

$$\text{USRTO} + (\text{ref time} - \text{UST}) = \text{BSRTO} + (\text{ref time} - \text{BST}) + \text{delay} \rightarrow 3 + (2:04 - 2:03) = 2 + (2:04 - 2:02) = 4$$

Thus, the monitoring station will know that it has made an exact match of songs, and the monitoring station also knows the origin of the song. As a result, the monitoring station can inform the user of the broadcast source.

The probability of misidentification is low, since the probability that a user sample is taken from the wrong broadcast channel or non-monitored audio source (such as a CD player) and happens to satisfy Equations (1) and (2) is fairly small.

A decision is thus made as to whether the user audio sample originated from a given broadcast source by noting whether Equations (1) and (2) hold. If a broadcast channel is found for which this holds then this broadcast channel is determined to be the channel to which the user is listening. This information is noted and relayed to the user or a reporting means, which uses the information for some follow-on action.

Figure 5:
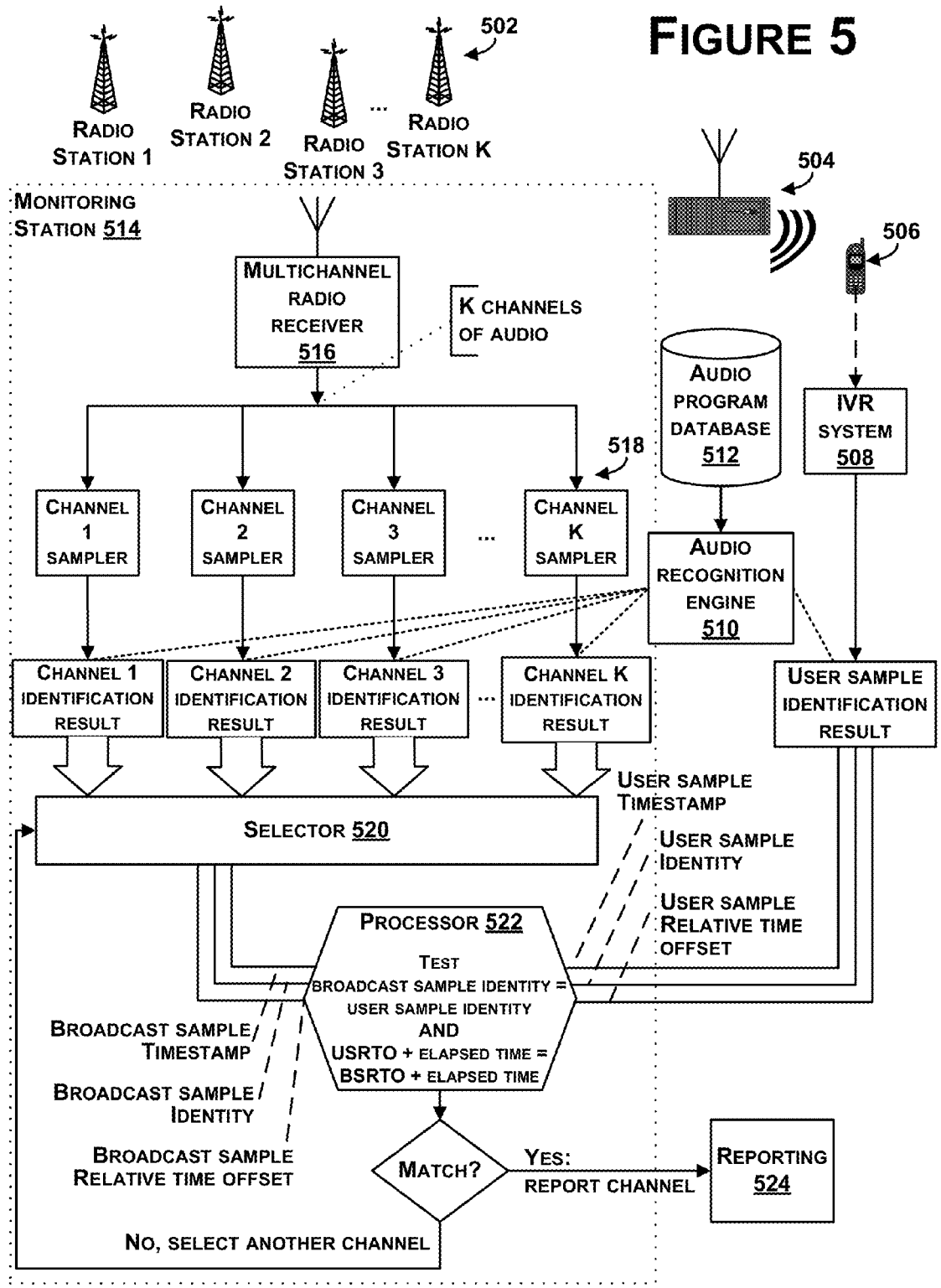
FIG. 5 illustrates another example of a system for identifying a broadcast source of an audio sample.

FIG. 5 illustrates one example of a system for identifying a broadcast source of an audio sample according to the method illustrated in FIG. 4. The audio sample may originate from any of radio station 1, radio station 2, radio station 3, . . . , or radio station k 502. A user may record the audio sample being broadcast from an individual receiver 504 on an audio sampling device 506 (e.g., a mobile telephone), along with a sample time (e.g., time according to standard reference clock at which the sample is recorded). The user may then dial a service to identify broadcast information pertaining to the audio sample using an IVR system 508, for example. The system 508 will initially identify the audio sample by contacting an audio recognition engine 510. In the case of a mobile telephone sampling device, the IVR system 508 may utilize a cellular communication network to contact the audio recognition engine 510, for example.

The audio recognition engine 510 will then identify the audio sample by performing a lookup within an audio program database 512 using the technique described within Wang and Smith, as described above, for example. In particular, the audio sample may be a segment of media data of any size obtained from a variety of sources. To perform data recognition, the sample should be a rendition of part of a media file indexed in a database. The indexed media file can be thought of as an original recording, and the sample as a distorted and/or abridged version or rendition of the original recording. Typically, the sample corresponds to only a small portion of the indexed file. For example, recognition can be performed on a ten-second segment of a five-minute song indexed in the database.

The database index contains fingerprints representing features at particular locations of the indexed media files. The unknown media sample is identified with a media file in the database (e.g., a winning media file) whose relative locations of fingerprints most closely match the relative locations of fingerprints of the sample. In the case of audio files, the time evolution of fingerprints of the winning file matches the time evolution of fingerprints in the sample.

Each recording in the database has a unique identifier, e.g., sound_ID. The sound database itself does not necessarily need to store the audio files for each recording, since the sound_IDs can be used to retrieve the audio files from elsewhere. The sound database index is expected to be very large, containing indices for millions or even billions of files. New recordings are preferably added incrementally to the database index.

Using the database of files, a relative time offset of sample can be determined. For example, the fingerprints of the audio sample can be compared with fingerprints of original files. Each fingerprint occurs at a given time, so after matching fingerprints to identify the audio sample, a difference in time between a first fingerprint of the audio sample and a first fingerprint of the stored original file will be a time offset of the audio sample, e.g., amount of time into a song. Thus, a relative time offset (e.g., 67 seconds into a song) at which the user began recording the song can be determined.

For more information on determining relative time offsets, the reader is referred to U.S. Patent Application Publication US 2002/0083060, to Wang and Smith, entitled System and Methods for Recognizing Sound and Music Signals in High Noise and Distortion, the entire disclosure of which is herein incorporated by reference as if fully set forth in this description.

In addition, an audio sample can be analyzed to identify its content using a localized matching technique. For example, generally, a relationship between two audio samples can be characterized by first matching certain fingerprint objects derived from the respective samples. A set of fingerprint objects, each occurring at a particular location, is generated for each audio sample. Each location is determined in dependence upon the content of respective audio sample and each fingerprint object characterizes one or more local features at or near the respective particular location. A relative value is next determined for each pair of matched fingerprint objects. A histogram of the relative values is then generated. If a statistically significant peak is found, the two audio samples can be characterized as substantially matching. For a more detailed explanation, the reader is referred to published PCT patent application WO 03/091990, to Wang and Culbert, entitled Robust and Invariant Audio Pattern Matching, the entire disclosure of which is herein incorporated by reference as if fully set forth in this description.

The two methods described above for identifying content of an audio sample (e.g., Wang and Smith, and Wang and Culbert) are examples only, since many other systems and methods exist that can be used for identifying content.

The audio recognition engine 510 will return the identity of the audio sample to the sampling device 506, along with a relative time offset of the audio sample as determined using the Wang and Smith technique, for example. The sampling device 506 may contact the monitoring station 514 and using the audio sample identity, relative time offset, and sample timestamp, the monitoring station 514 can identify the broadcast source of the audio sample.

The broadcast monitoring station 514 monitors each broadcast channel of the radio stations 502. The monitoring station 514 includes a multi-channel radio receiver 516 to receive broadcast information from the radio stations 502. The broadcast information is sent to channel samplers 1 ... k 518, which identify content of the broadcast samples by contacting the audio recognition engine 510. Similar to the user sampling device 506, the monitoring station 514 may utilize a standard telephone network to contact the audio recognition engine 510. In addition, the monitoring station 514 may also include a form of an audio recognition engine to reduce delays in identifying the broadcast samples, for example.

The monitoring station 514 can then store the broadcast sample identities for each broadcast channel for a certain amount of time. After a predetermined amount of time, the monitoring station 514 can write over stored broadcast sample identities to refresh the information to coordinate to audio samples currently being broadcast, for example.

Upon receiving an inquiry from the user sampling device 506 to determine broadcast information corresponding to a given audio sample, the monitoring station 514 performs the tests according to Equations (1) and (2) above. In particular, a processor 522 in the monitoring station 514 first selects a given broadcast channel (using selector 520) to determine if a broadcast sample identity of a broadcast sample recorded at or near the user sample time matches the user audio sample identity. If not, the selector 520 selects the next broadcast channel and continues searching for an identity match.

Once an identity match is found, the processor 522 then determines if the user sample relative time matches the broadcast sample relative time for this broadcast channel. If not, the selector 520 selects the next broadcast channel and continues searching for an identity match. If the relative times match (within an approximate error range) then the processor 522 considers the audio sample and the broadcast sample to be a match.

After finding a match, the processor 522 reports information pertaining to the broadcast channel to a reporting center 524. The processor 522 may also report the broadcast information to the user sampling device 506, for example. The broadcast information may include a radio channel identification, promotional material, advertisement material, discount offers, or other material relating to the particular broadcast station, for example.

Additional Correlation Factors

Additional factors may also be considered when attempting to find a match to the audio sample. For example, in one embodiment, when identifying music at high duty cycles of sample vs. non-sampled time, many, if not all broadcast stations, incorporate voice over or other non-music material that frequently is superimposed upon the music streams to be identified, e.g., DJ's talking over the beginning and end of records. Thus, the monitoring station 514 could use variations in recognition score (or non-recognition) as a "signature" of the performance of a track or audio sample on a station at a certain time and date, which can be used as a further correlation factor to determine station identity.

In another embodiment, to further verify that the user is actually listening to a given broadcast channel, and that it is not just a coincidence (such as a user taking a recording from a CD player), user samples can be taken over a longer period of time, e.g., longer than a typical audio program, such as over a transition between audio programs on the same channel. If a match that is considered to be correct is actually the correct channel, a content alignment should be continuously maintained between song transitions. An exception can occur when the user records an audio sample while changing broadcast channels. However, continuity of identity over a program transition may be an indicator that the correct broadcast channel is being tracked. Thus, sample identity (e.g., Equation (1)) can be tracked, and user sample identity changes can also be tracked. For example, sample identities at multiple time periods can be tracked (as shown below in Equations 3-5), and if a first sample identity does not equal a second sample identity from a second time period (as shown below in Equation 5), then the continuity or transition between songs has been tracked. This can provide further confidence that a correct match has been made (e.g., when both the user and the broadcast sources change synchronously).

$$\text{User sample identity}[n] = \text{Broadcast sample identity}[n] \quad \text{Equation (3)}$$

$$\text{User sample identity}[n+1] = \text{Broadcast sample identity}[n+1] \quad \text{Equation (4)}$$

$$\text{User sample identity}[n] \neq \text{User sample identity}[n+1] \quad \text{Equation (5)}$$

where [n] is the nth sample in time.

If it is determined that a user has changed channels, the monitoring station 514 can then search for an identify match for the new identity of the audio sample to verify the new broadcast source to which the user is listening.

In yet another embodiment, broadcast source identification may be performed by determining certain systematic distortions of audio as the audio is being played. As an example, often times a radio broadcaster will play an audio program slightly faster or slower than the original recording, owing to slight inaccuracies in a crystal oscillator or other time-base used to play back the program recording. A speed percentage stretch may be measured during the identification process, using the technique of Wang and Culbert described above, for example. If a time-base of a broadcast program is stretched and also substantially similar to a stretch factor measured in a user sample, then the user sample is highly likely to have originated from the same source, e.g., as shown below in Equation (6).

$$\text{User sample stretch ratio} = \text{Broadcast sample stretch ratio} \quad \text{Equation (6)}$$

Furthermore, for the purposes of identification, a program may be intentionally stretched by a predetermined amount. The predetermined stretch amount could be used to encode a small amount of information. For example, a recording could be stretched to play 1.7% slower. Such a slowdown may not be noticeable to most people. However, if the recognition algorithm is capable of reporting stretch values with 0.05% tolerance, it may be possible to encode 10-20 different messages if playback speeds between −2.0% and +2.0% with 0.1% to 0.2% steps are used, for example.

Furthermore, a stream of information may be embedded in audio by varying a playback speed dynamically (but slowly) over a small range. For example, a frame size of 10 seconds could be used, and each 10 second segment may be sped up or slowed down by a small percentage. If the stretch factors are continually extracted, the values may define a message being sent by the broadcaster.

Many embodiments have been described as being performed, individually or in combination with other embodiments, however, any of the embodiments described above may be used together or in any combination to enhance certainty of an opinion that a broadcast channel has been identified.

Note that while the present application has been described in the context of a fully functional recognition system and method, those skilled in the art will appreciate that the mechanism of the present application is capable of being distributed in the form of a computer-readable medium of instructions in a variety of forms, and that the present application applies equally regardless of the particular type of signal bearing media used to actually carry out the distribution. Examples of such computer-accessible devices include computer memory (RAM or ROM), floppy disks, and CD-ROMs, as well as transmission-type media such as digital and analog communication links.

While examples have been described in conjunction with present embodiments of the application, persons of skill in the art will appreciate that variations may be made without departure from the scope and spirit of the application. For example, the apparatus and methods described herein may be implemented in hardware, software, or a combination, such as a general purpose or dedicated processor running a software application through volatile or non-volatile memory. The true scope and spirit of the application is defined by the appended claims, which may be interpreted in light of the foregoing.

What is claimed is:

1. A method for identifying a source of content comprising:
   receiving a sample of content that includes a rendition of a segment of content from a source;
   determining characteristics of the sample of content;
   performing in real-time upon receipt of the sample of content, by a processor, a comparison of the characteristics of the sample of content with characteristics of a source sample taken from content rendered by a known source, wherein the sample of content is received at a time when the content from which the source sample is taken is being rendered by the known source; and
   based on the comparison, determining whether the known source rendered the segment of content.

2. The method of claim 1, wherein performing in real-time the comparison comprises in response to receiving the sample of content, comparing the characteristics of the sample of content with characteristics of the source sample taken from content rendered by the known source.

3. The method of claim 1, wherein performing in real-time the comparison comprises:
   for a given number of a plurality of source samples taken from content rendered by known sources, performing a comparison of the characteristics of the sample of content with characteristics of the plurality of source samples taken from content rendered by known sources; and
   based on the comparisons, identifying one of the known sources as a source from which the segment of content was rendered.

4. The method of claim 1, further comprising, upon receiving the sample of content:
   determining the characteristics of the sample of content; and
   performing in real-time, by the processor, the comparison of the characteristics of the sample of content with characteristics of the source sample taken from content rendered by the known source.

5. The method of claim 1, further comprising comparing an identity of the sample of content with an identity of the source sample.

6. The method of claim 1, wherein receiving the sample of content comprises receiving the sample of content from a client device that recorded the sample of content.

7. The method of claim 6, further comprising sending information identifying the known source to the client device.

8. The method of claim 6, further comprising the client device:
   determining the characteristics of the sample of content;
   performing in real-time the comparison of the characteristics of the sample of content with characteristics of the source sample taken from content rendered by the known source; and
   based on the comparison, determining whether the known source rendered the segment of content.

9. The method of claim 1, wherein determining characteristics of the sample of content comprises determining a value that describes features in the sample of content.

10. The method of claim 1, wherein determining characteristics of the sample of content comprises determining a value that is a hashed function of multiple features of the sample of content.

11. The method of claim 1, further comprising:
    storing in a rolling buffer for a predetermined amount of time characteristics for a plurality of source samples taken from content rendered by a plurality of known sources, wherein contents of the rolling buffer are overwritten over time to include characteristics of source samples subsequently taken, and
    wherein performing in real-time the comparison comprises comparing the characteristics of the sample of content with the contents of the rolling buffer.

12. The method of claim 11, wherein a length of the rolling buffer is based on a time constraint during which the real-time comparison is performed.

13. The method of claim 11, wherein performing in real-time the comparison comprises comparing the characteristics of the sample of content with given characteristics of given source samples taken from content rendered by given known sources within a time period based on an amount of storage of the rolling buffer.

14. The method of claim 1, further comprising:
    searching respective characteristics of source samples taken from content rendered by known sources and rendered within a sampling time of the sample of content for a match with the characteristics of the sample of content; and
    based further on given matches occurring within the sampling time, determining whether the known source rendered the segment of content.

15. A non-transitory computer readable medium having stored therein instructions executable by a computing device to cause the computing device to perform functions comprising:
    receiving a sample of content that includes a rendition of a segment of content from a source;
    determining characteristics of the sample of content;
    performing in real-time upon receipt of the sample of content, by the computing device, a comparison of the characteristics of the sample of content with characteristics of a source sample taken from content rendered by a known source, wherein the sample of content is received at a time when the content from which the source sample is taken is being rendered by the known source; and based on the comparison, determining whether the known source rendered the segment of content.

16. The non-transitory computer readable medium of claim 15, wherein the instructions are further executable by the computing device to cause the computing device to perform functions comprising:

upon receiving the sample of content,
determining characteristics of the sample of content; and
comparing the characteristics of the sample of content with characteristics of the source sample taken from content rendered by the known source.

17. The non-transitory computer readable medium of claim 15, wherein the instructions are further executable by the computing device to cause the computing device to perform functions comprising:

for a given number of a plurality of source samples taken from content rendered by known sources, performing a comparison of the characteristics of the sample of content with characteristics of the plurality of source samples taken from content rendered by known sources; and based on the comparisons, identifying one of the known sources as a source from which the segment of content was rendered.

18. A monitoring station comprising:

a broadcast channel sampler configured to receive source samples of content rendered by respective known sources; and a processor configured to receive from a client device a sample of content that is a rendition of a segment of content from a source, to perform in real-time upon receipt of the sample of content a comparison of characteristics of the sample of content with respective characteristics of the source samples, wherein the sample of content is received at a time when the content from which the source sample is taken is being rendered by the known source, and based on the comparison to determine whether a known source rendered the segment of content.

19. The monitoring station of claim 18, wherein the processor is further configured to store in a rolling buffer for a predetermined amount of time characteristics for the source samples, wherein contents of the rolling buffer are overwritten over time to include characteristics of source samples subsequently received, and wherein the processor is configured to perform in real-time the comparison by comparing the characteristics of the sample of content with the contents of the rolling buffer.

* * * * *